(12) United States Patent
Cho (10) Patent No.: US 7,137,342 B2
(45) Date of Patent: Nov. 21, 2006

(54) CARRIER MOVING SYSTEM FOR A PAINTING PROCESS

(75) Inventor: Hyun Chul Cho, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/028,278

(22) Filed: Dec. 30, 2004

(65) Prior Publication Data
US 2006/0054049 A1   Mar. 16, 2006

(30) Foreign Application Priority Data
Sep. 13, 2004   (KR) .................. 10-2004-0073045

(51) Int. Cl.
*B61J 3/00* (2006.01)
(52) U.S. Cl. .................................... 104/88.01
(58) Field of Classification Search ............. 104/88.01, 104/96, 118, 130.01, 130.04, 172.3
See application file for complete search history.

(56) References Cited

U.S. PATENT DOCUMENTS

| | | | | |
|---|---|---|---|---|
| 3,977,224 A * | 8/1976 | Stubbins | ................. | 72/201 |
| 4,074,632 A * | 2/1978 | Kurahasi et al. | ....... | 104/130.01 |
| 4,542,698 A * | 9/1985 | Wakabayashi | ........... | 104/172.3 |
| 4,669,168 A * | 6/1987 | Tamura et al. | ................ | 29/429 |
| 5,272,924 A * | 12/1993 | Tassic et al. | ........... | 73/862.391 |

\* cited by examiner

*Primary Examiner*—S. Joseph Morano
*Assistant Examiner*—Robert J. McCarry, Jr.
(74) *Attorney, Agent, or Firm*—Morgan Lewis & Bockius LLP (57) ABSTRACT

A carrier moving system for a painting process of a vehicle includes a loaded section, an unloaded section, and a plurality of multi-joint type carriers. The multi-joint carriers include a driving part and a driven part. A guiding monorail is disposed through both the loaded section and the unloaded section so as to guide each multi-joint type carrier through both sections. A storing monorail disposed in the unloaded section and arranged in parallel with the guiding monorail and a switching unit for switching a position of the driven part of the multi-joint type carrier between the guiding monorail and the storing monorail.

10 Claims, 9 Drawing Sheets

CARRIER MOVING SYSTEM FOR A PAINTING PROCESS

CROSS REFERENCE TO RELATED APPLICATION(S)

This application claims priority to Korean Patent Application No. 10-2004-0073045, filed on Sep. 13, 2004, the disclosure of which is incorporated herein by reference.

TECHNICAL FIELD OF THE INVENTION

Generally, the present invention relates to a carrier moving system. More particularly, the present invention relates to a carrier moving system for a painting process.

BACKGROUND OF THE INVENTION

Typically, a carrier moving system is a system that moves a carrier loading a vehicle (or a vehicle body) in a process line. Among such systems, a conventional carrier moving system for a painting process includes a loaded section and an unloaded section. The loaded section is where a carrier with a body-in-white (BIW) moves. The unloaded section is where a carrier without a BIW moves (or stays).

The loaded section includes a loading part and a guiding part. The loading part loads the BIW into the carrier. The guiding part guides the carrier with the loaded BIW and may store the carrier with the loaded BIW so as to prepare for a wrong operation of pre-process (body manufacturing process). The unloaded section includes an unloading part and a carrier without a BIW storing part, which is referred to as a CWB storage hereinafter. The unloading part unloads the BIW into a painting part. The CWB storage moves and stores a carrier without BIW (CWB) so as to prepare a call for a carrier without BIW of the loading part. Hereinafter, the carrier without BIW is referred to as a CWB, and a call for a carrier without BIW is referred to as a CWB call.

In addition, the loaded section and the unloaded section have a monorail for guiding a carrier, and are also connected to each other by the monorail. The monorail of the loaded section has a plurality of rounded portions such that many carriers can be moved thereon. The carrier has a plurality of joints so as to move smoothly in the rounded portions.

The CWB storage has an inline type of structure such that the CWB is stored in a row on the monorail in line. On the other hand, if the BIW is not thrown into the loading part while the body manufacturing process line is broken, the loading part does not require the CWB call to the CWB storage. Therefore, the CWB is continuously stored in the CWB storage. However, the CWB storage can not store many CWBs, since the CWB storage has an inline type structure where the CWB is stored in a row on the monorail with inline type. Accordingly, a conventional carrier moving system for a painting process has a problem that a movement of the BIW must be stopped, while the body manufacturing process line is broken.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a carrier moving system for a painting process having non-limiting advantages of an enhanced reception capacity. An embodiment of the carrier moving system includes a loaded section, an unloaded section, and a plurality of multi-joint type carriers respectively. These multi-joint type carriers include a driving part and a driven part. A guiding monorail is disposed through both the loaded section and the unloaded section so as to guide each multi-joint type carrier through both sections. A storing monorail is disposed in the unloaded section and arranged in parallel with the guiding monorail. Also a switching unit for switching a position of the driven part of the multi-joint type carrier between the guiding monorail and the storing monorail.

In a further embodiment, the guiding monorail has a first removed portion formed at a predetermined portion of the guiding monorail, the predetermined portion being opposite an entrance of the storing monorail. A second removed portion is formed at a predetermined portion of the guiding monorail, the predetermined portion opposite to an exit of the storing monorail.

In another further embodiment according to the present invention, the switching unit includes: a first switch located to the first removed portion, and switching the driven part to the storing monorail when the carrier comes into the storing monorail; and a second switch located to the second removed portion, and switching the driven part to the guiding monorail when the carrier goes out of the storing monorail.

In another further embodiment, the first switch includes a first switch body located to the first removed portion of the guiding monorail. A first slider slidably disposed on the first switch body. A first track disposed on the first slider so as to interconnect the guiding monorails respectively located to a front side and a rear side with respect to the first removed portion at need. A second track disposed on the first slider so as to interconnect the guiding monorail and the storing monorail. A first power source disposed between the first switch body and the first slider, and moving the first slider at need.

In another further embodiment, the second switch includes a second switch body located to the second removed portion of the guiding monorail. A second slider slidably disposed on the second switch body and a first track disposed on the second slider, and interconnecting the guiding monorails respectively located to a front side and a rear side with respect to the second removed portion. A second track disposed on the second slider, and interconnecting between the guiding monorail and the storing monorail at need. Also included is a second power source disposed between the second switch body and the second slider, and moving the second slider at need.

In another further embodiment, the plurality of multi-joint type carriers includes a first multi-joint type carrier and a second multi-joint type carrier; and wherein the first and second multi-joint type carriers include a gap maintaining unit such that a gap between the first and second multi-joint type carriers is fixedly maintained, while the first and second multi-joint type carriers exist in the storing monorail. In yet another further embodiment, the gap maintaining unit includes a dog disposed on the driving part of the first multi-joint type carrier. A front bar with a predetermined length disposed on the driving part of the second multi-joint type carrier and a sensor disposed on the front bar corresponding to the dog.

BRIEF DESCRIPTION OF THE DRAWINGS

The accompanying drawings illustrate exemplary embodiments of the present invention, and read together with the description, serve to explain the principles of the present invention, wherein.

DETAILED DESCRIPTION OF THE EMBODIMENTS

Figure 1:
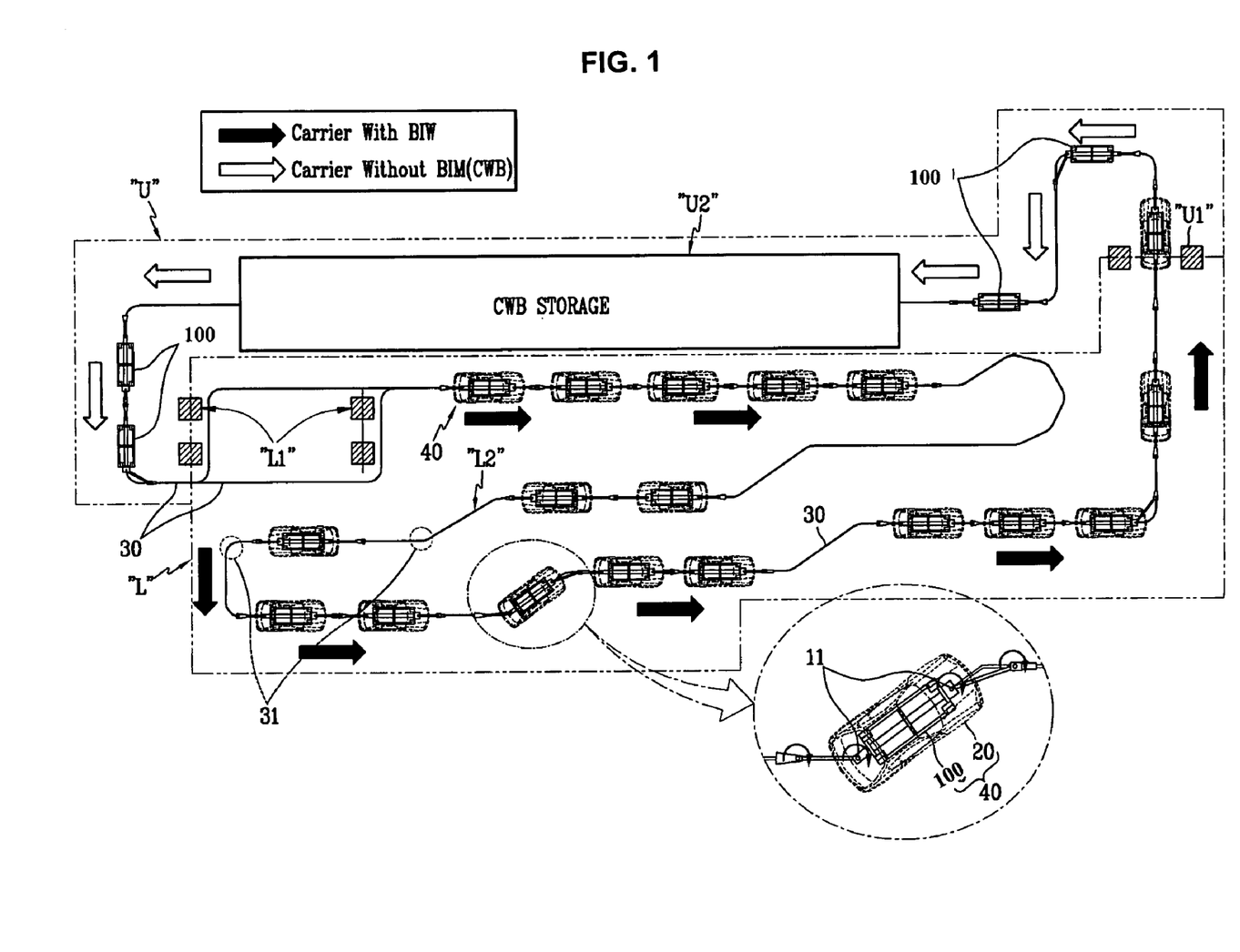
FIG. 1 is a general schematic of a carrier moving system for a vehicle painting process.

According to FIG. 1, a carrier moving system for a painting process includes a loaded section, L an unloaded section U. According to FIG. 2, the system also includes a plurality of multi-joint type carriers 100, a guiding monorail 200, a storing monorail 300, and a switching unit 400. Each multi-joint type carrier 100 includes a driving part 120 (FIG. 3) and a driven part 130 (FIG. 3). The driving part 120 is disposed on a front portion of the carrier 100. The driven part 130 is disposed on a rear portion of the carrier 100. The guiding monorail 200 is disposed through both the loaded section L and the unloaded section U so as to guide each multi-joint type carrier 100 through both sections. The storing monorail 300 is disposed in the unloaded section U, and is arranged in parallel with the guiding monorail 200. The switching unit 400 switches a position of the driven part 130 of the multi-joint type carrier 100 between the guiding monorail 200 and the storing monorail 300.

FIG. 3 shows the multi-joint type carrier 100 includes a body 110, a front bar 140, and a rear bar 150. The front bar 140 is forward disposed on the driving part 120, and has a predetermined length. The rear bar 150 is backward disposed on the driven part 120, and has a predetermined length. In addition, the plurality of multi-joint type carriers 100 respectively includes a sensor 160 and a main dog 170, such that a gap between the multi-joint type carriers 100 can be maintained in the loaded section L.

The sensor 160 is disposed on a front end of the front bar 140. The main dog 170 is disposed on the rear end of the rear bar 150. In addition, each multi-joint type carrier 100 includes: a first joint 181; a second joint 182; a third joint 183; and a fourth joint 184, such that the multi-joint type carrier 100 is smoothly moved in a rounded portion 31 (FIG. 1) of the guiding monorail 200.

The first joint 181 is disposed between the sensor 160 and the front bar 140. The second joint 182 is disposed between the front bar 140 and the driving part 120. The third joint 183 is disposed between the driven part 130 and the rear bar 150. The fourth joint 184 is disposed between the rear bar 150 and the main dog 170. In addition, the storing monorail 300 is located to a CWB storage (U2 in FIG. 1) of the unloaded section U.

Figure 2:
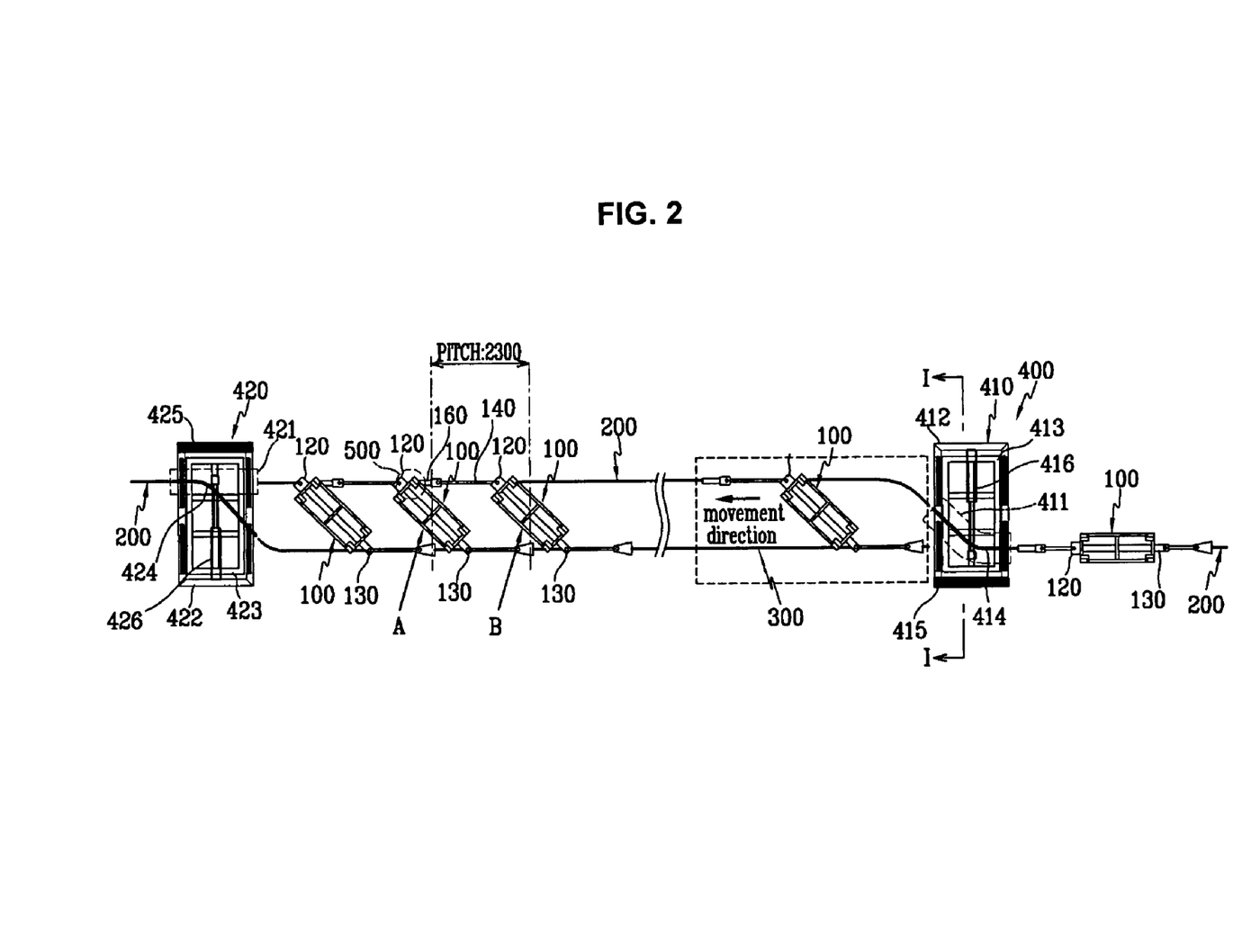
FIG. 2 is a schematic view showing a carrier moving system for a painting process according to an embodiment of the present invention.
Figure 3:
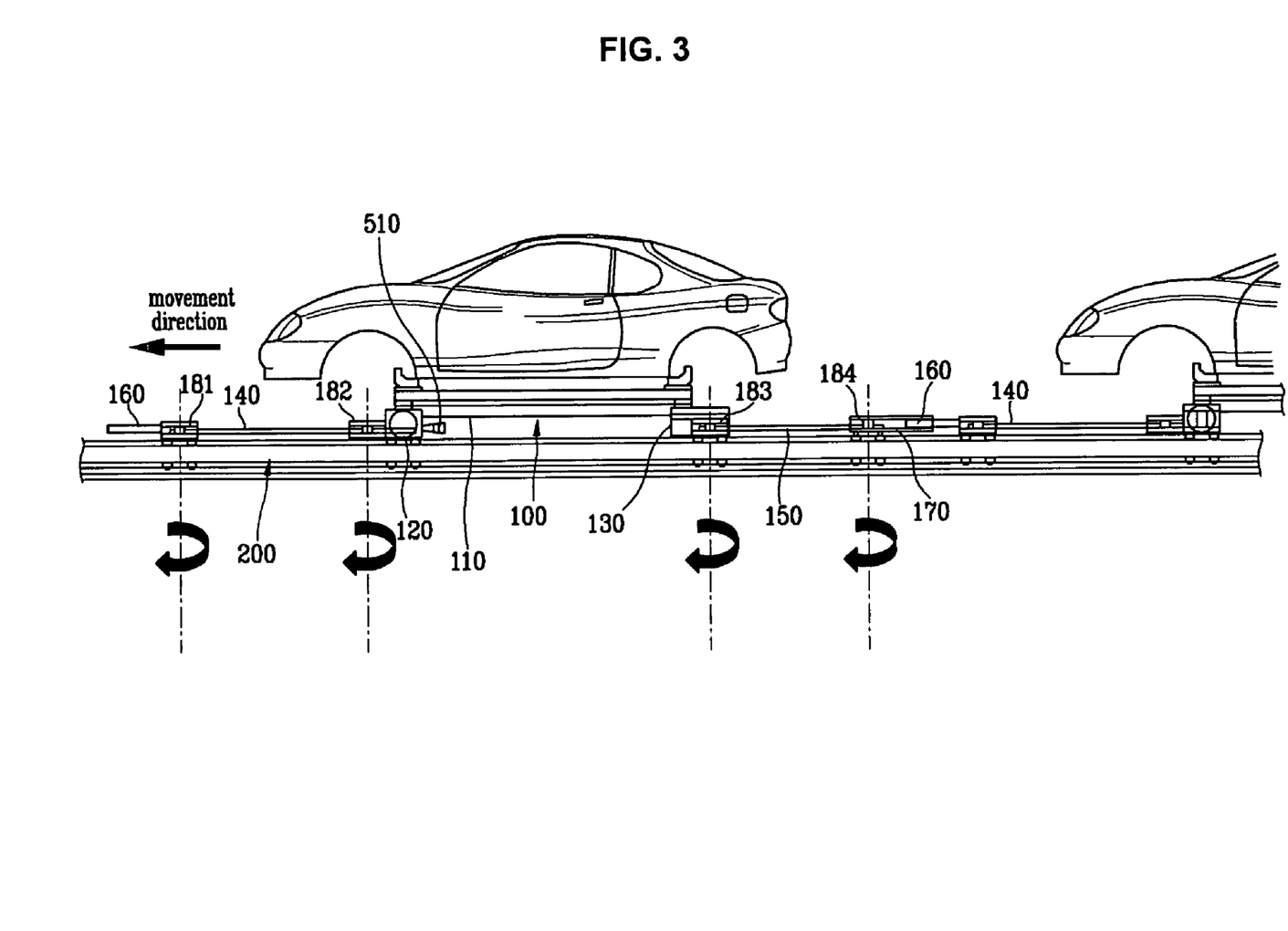
FIG. 3 is a schematic view showing a multi-joint type carrier of a carrier moving system for a painting process according to an embodiment of the present invention.

As shown in FIG. 2, the guiding monorail 200 has a first removed portion 411 and a second removed portion 421. The switching unit 400 includes a first switch 410 and a second switch 420. The first removed portion 411 is formed at a predetermined portion of the guiding monorail 200, the predetermined portion opposite to an entrance of the storing monorail 300. The second removed portion 421 is formed at a predetermined portion of the guiding monorail 200, the predetermined portion opposite to an exit of the storing monorail 300. The first switch 410 is located to the first removed portion 411, and switches the driven part 130 to the storing monorail 300 when the carrier 100 comes into the storing monorail 300. The second switch 420 is located to the second removed portion 421, and switches the driven part 130 to the guiding monorail 300 when the carrier 100 goes out of the storing monorail 300.

Figure 4:
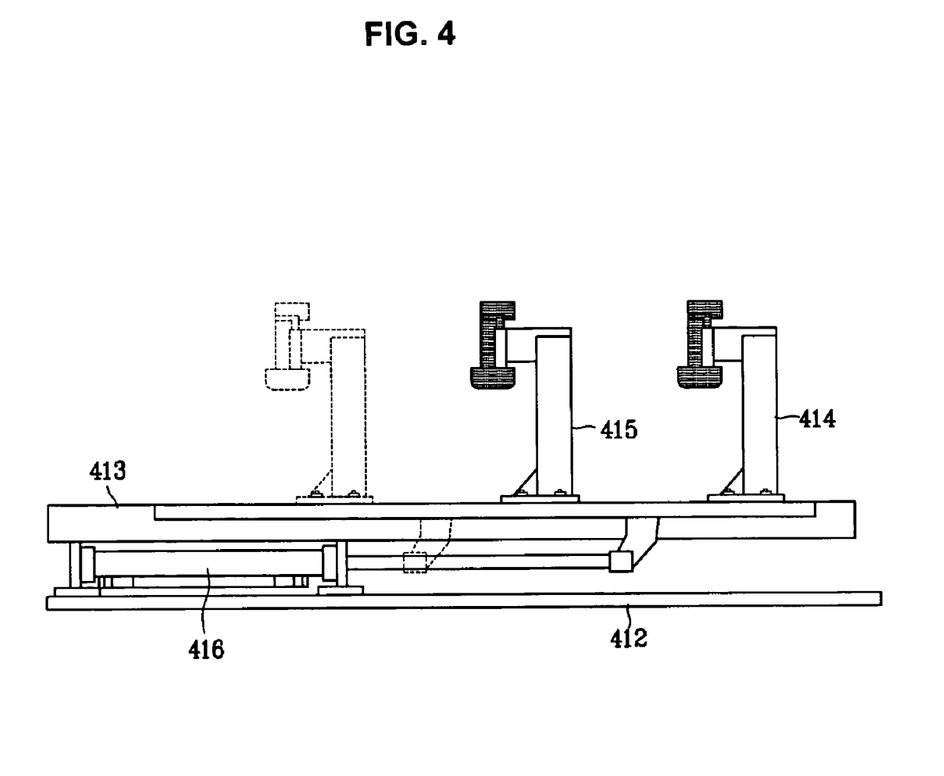
FIG. 4 is a cross-sectional view of the line I—I in FIG. 2 showing a switching unit of a carrier moving system for a painting process according to an embodiment of the present invention.

FIG. 4 is a cross-sectional view of the line I—I in FIG. 2 showing a switching unit of a carrier moving system for a painting process according to an embodiment of the present invention. As shown in FIGS. 2 and 4, the first switch 410 includes a first switch body 412, a first slider 413, a first track 414 for the driving part 120, a second track 415 for the driven part 130, and a first power source 416. The first switch body 412 is located to the first removed portion 411 of the guiding monorail 200. The first slider 413 is slidably disposed on the first switch body 412. The first track 414 is disposed on the first slider 413 so as to interconnect the guiding monorails respectively located to a front side and a rear side with respect to the first removed portion 411. The second track 415 is disposed on the first slider 413 so as to interconnect the guiding monorail 200 and the storing monorail 300. The first power source 416 is disposed between the first switch body 412 and the first slider 413, and moves the first slider 413 at need. For example, the first power source 416 may be a hydraulic cylinder.

As shown in FIG. 2, the second switch 420 includes a second switch body 422, a second slider 423, a first track 424 for the driving part 120, a second track 425 for the driven part 130, and a second power source 426. The second switch body 422 is located to the second removed portion 421 of the guiding monorail 200. The second slider 423 is slidably disposed on the second switch body 422. The first track 424 is disposed on the second slider 423 so as to interconnect the guiding monorails 200 respectively located to a front side and a rear side with respect to the second removed portion 421. The second track 425 is disposed on the second slider 423 so as to connect the guiding monorail 200 and the storing monorail 300. The second power source 426 is disposed between the second switch body 422 and the second slider 423, and moves the second slider 423 at need. For example, the second power source 426 may be a hydraulic cylinder.

Figure 5:
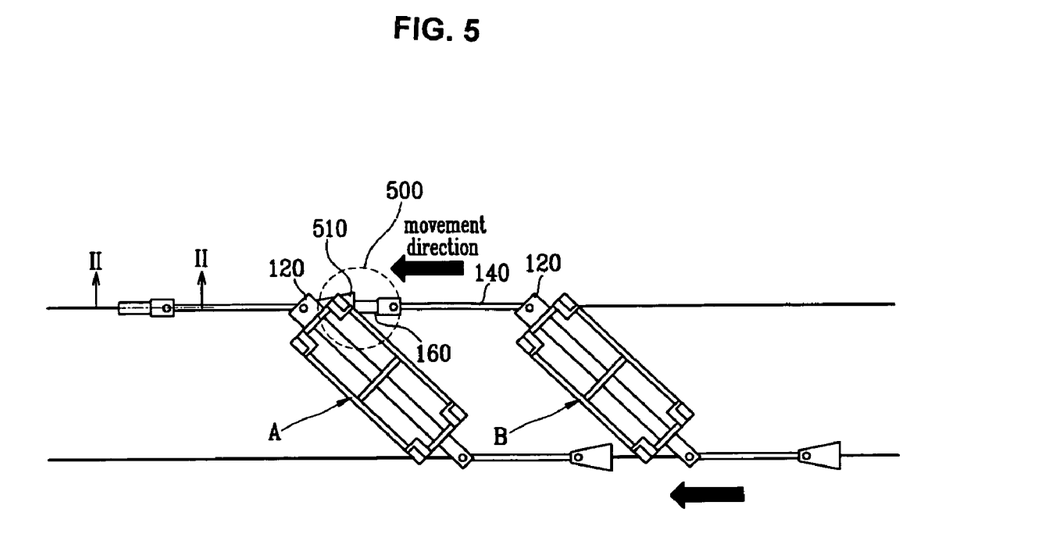
FIG. 5 is a schematic view showing a gap maintaining unit of a carrier moving system for a painting process according to an embodiment of the present invention.

FIG. 5 is a schematic view showing a gap maintaining unit of a carrier moving system for a painting process according to an embodiment of the present invention. As shown in the FIGS. 2 and 5, the plurality of multi-joint type carriers 100 includes a first multi-joint type carrier A and a second multi-joint type carrier B. The first and second multi-joint type carriers A and B, include a gap maintaining unit 500 such that a gap between the first and second multi-joint type carriers A and B is fixedly maintained, while the first and second multi-joint type carriers A and B exist in the storing monorail 300. For example, as shown in FIGS. 3 and 5, the gap maintaining unit 500 includes an assistance dog 510 disposed on a predetermined portion of the driving part 120 corresponding to the sensor 160 of the front bar 140. The predetermined portion of the driving part 120 is a portion opposite to a movement direction of the carrier 100.

Figure 6:
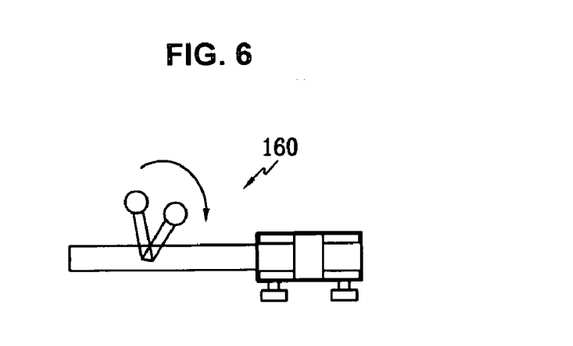
FIG. 6 is a cross-sectional view of the line II—II in FIG. 5.

As shown in FIG. 6, the sensor 160 may be a lever sensor that is turned over when the assistance dog 510 is contacted thereto. Accordingly, the sensed signal by the lever sensor 160 is transmitted to a controller and then the controller stops a movement of the second multi-joint type carrier B.

FIGS. 7a–7d are principle part views of FIG. 2 and show how a switching unit is operated when a multi-joint type carrier comes into the storing monorail. FIGS. 8a–8d are also principle part views of FIG. 2, and show how a switching unit is operated when a multi-joint type carrier goes out of the storing monorail. An operation of a carrier moving system for a painting process according to an embodiment of the present invention will hereinafter be described in detail with FIGS. 2, and 7a–8d.

Figure 7A:
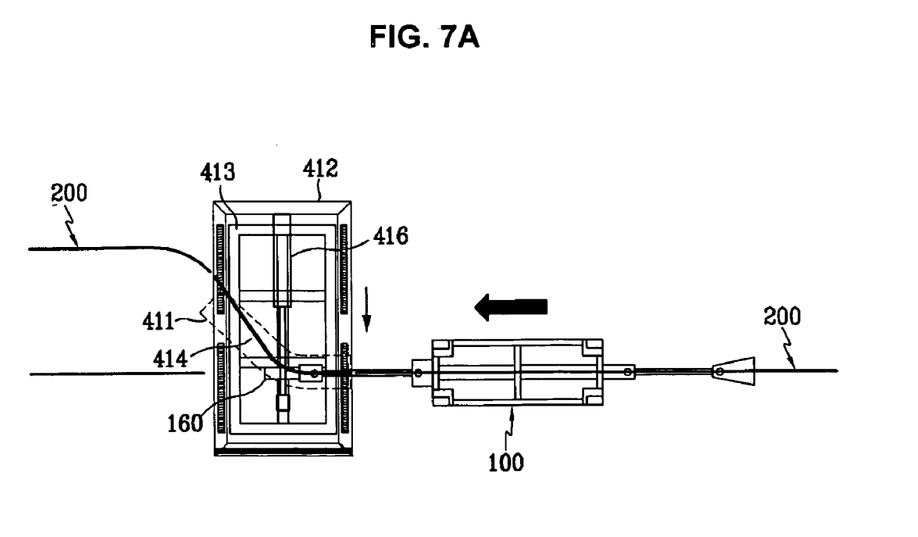
FIGS. 7a–7d are principle part views of FIG. 2, and show how a switching unit is operated when a multi-joint type carrier comes into the storing monorail according to an embodiment of the present invention.

Firstly, as shown in FIG. 7a, when the sensor 160 of the carrier 100 comes into the first switch body 412 along the guiding monorail 200, the first slider 413 is moved toward a down direction in the FIG. by the first power source 416. Then, the guiding monorails 200 that are respectively located to a front side and a rear side with respect to the first removed portion 411 are connected to each other by the first track 414.

Figure 7B:
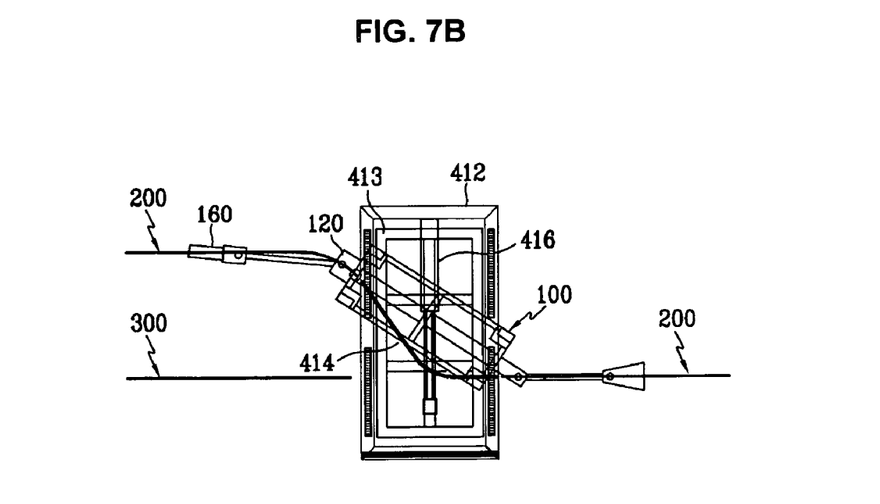
Figure 7C:
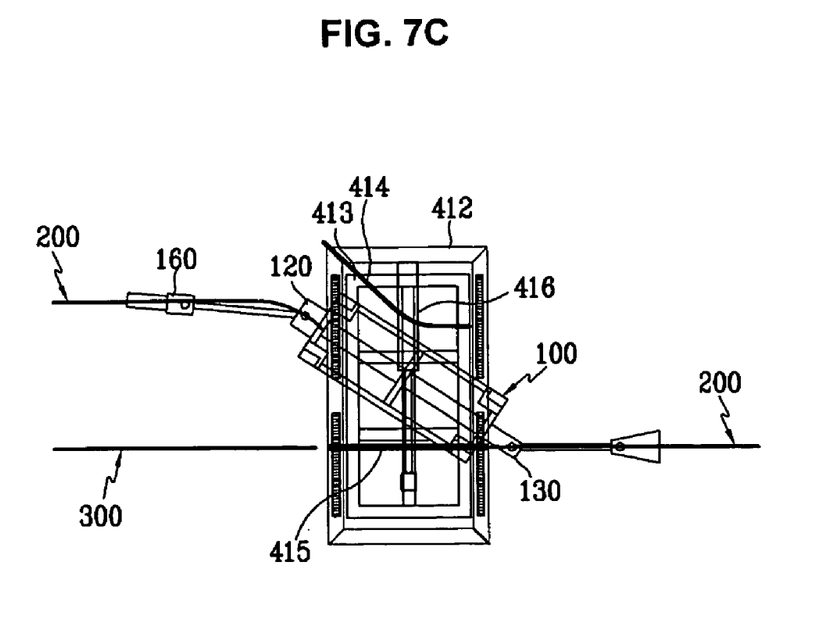
Figure 7D:
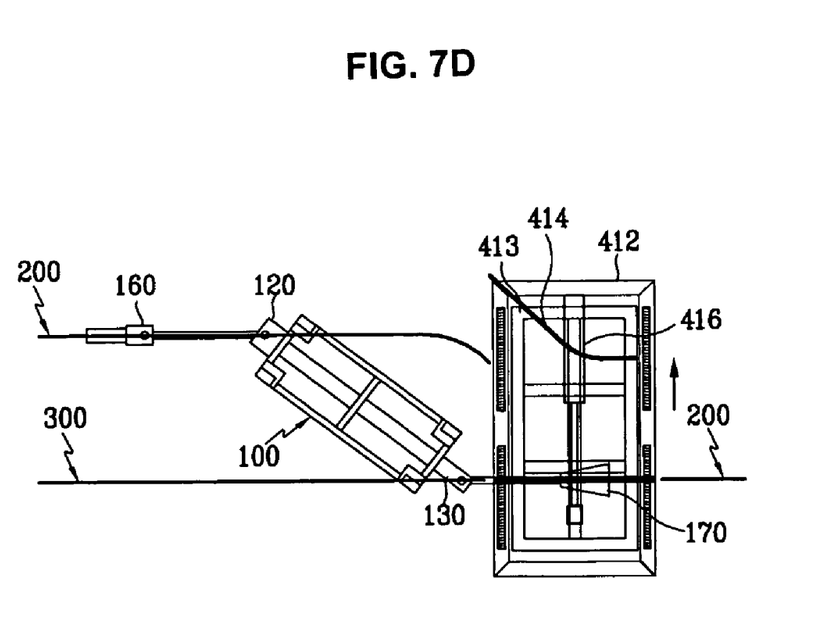

Accordingly, as shown in FIG. 7b, the driving part 120 of the carrier 100 moves into the guiding monorail 200 that is located to a front side with respect to the second removed portion 411 along the first track 414. Secondly, as shown in FIG. 7c, when the driven part 130 of the carrier 100 comes into the first switch body 412 along the guiding monorail 200, the driving part 120 of the carrier 100 is stopped. At the same time, the first slider 413 is moved toward a top direction of the FIG. by the first power source 416. Next, the storing monorail 300 and the guiding monorail 200 are connected to each other by the first track 415. Accordingly, as shown in FIG. 7d, the driven part 130 of the carrier 100 moves into the storing monorail 300 along the second track 415.

Figure 8A:
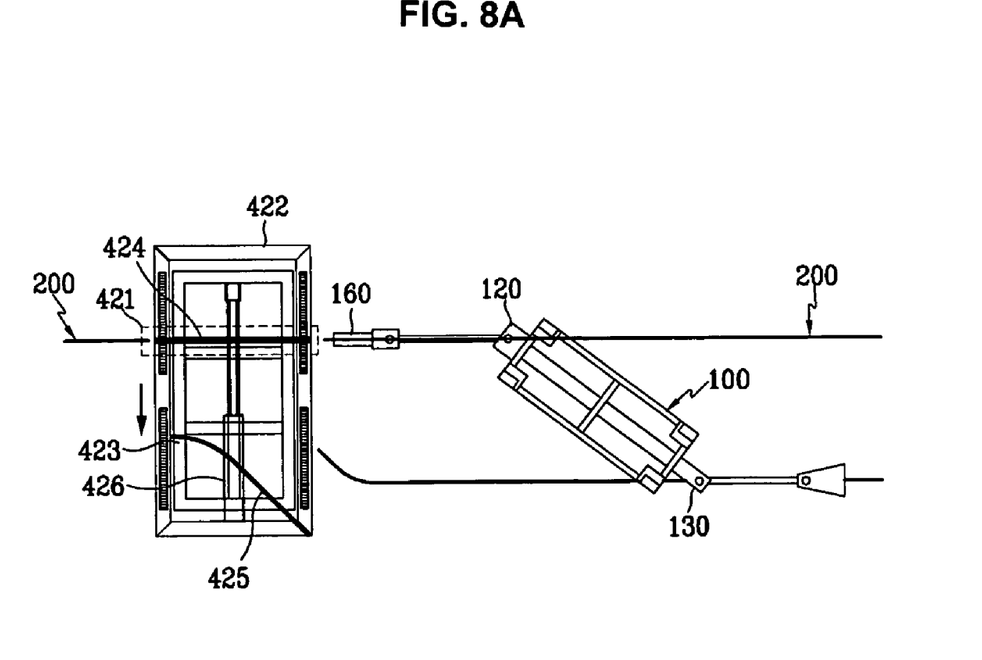
FIGS. 8a–8d are principle part views of FIG. 2, and show how a switching unit is operated when a multi-joint type carrier goes out of the storing monorail according to an embodiment of the present invention.

Thirdly, as shown in FIG. 8a, when the sensor 160 of the carrier 100 comes into the second switch body 422 along the guiding monorail 200, the second slider 423 is moved toward a down direction of the FIG. by the second power source 426. And then, the guiding monorails 200 that are respectively located to a front side and a rear side with respect to the second removed portion 421 are connected to each other by a first track 424.

Figure 8B:
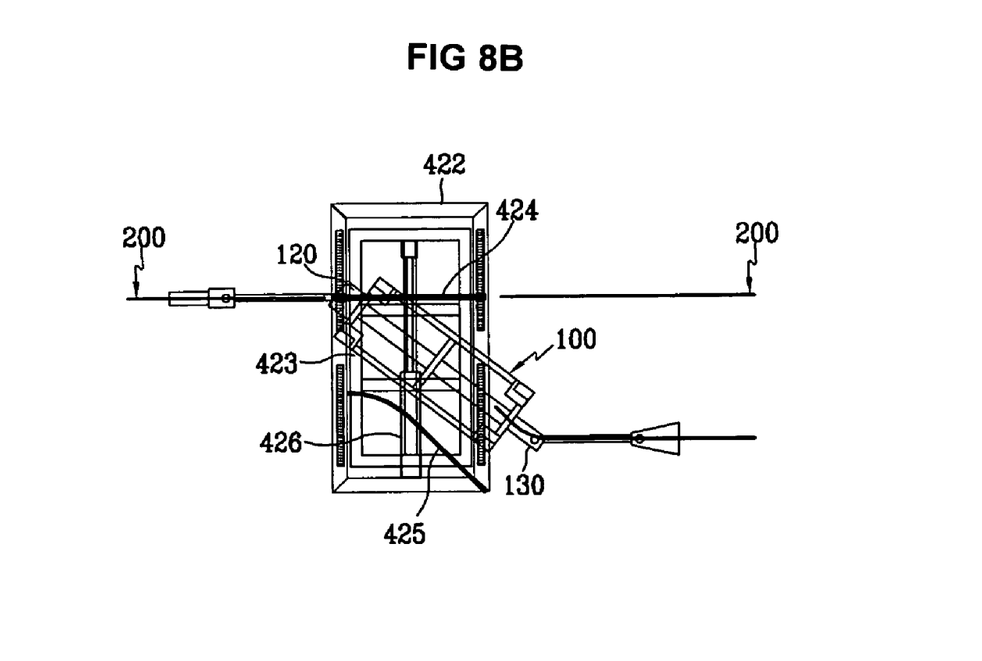
Figure 8C:
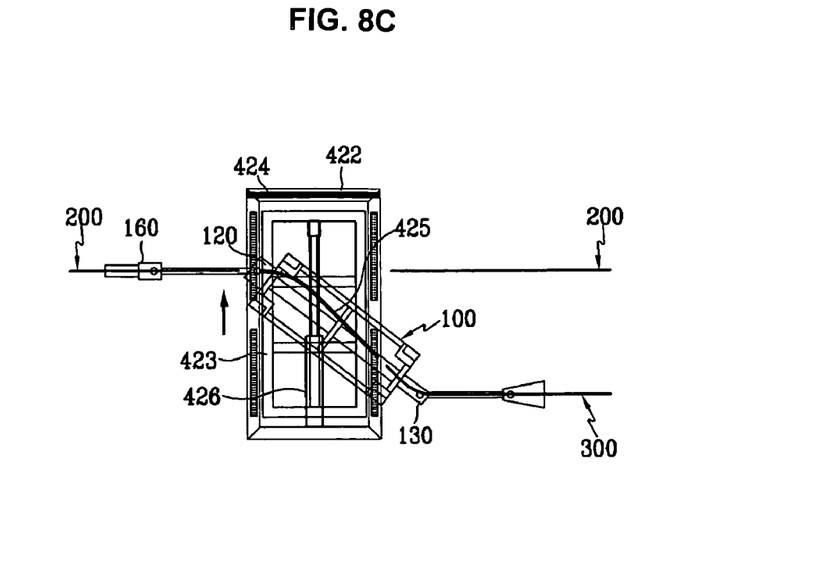
Figure 8D:
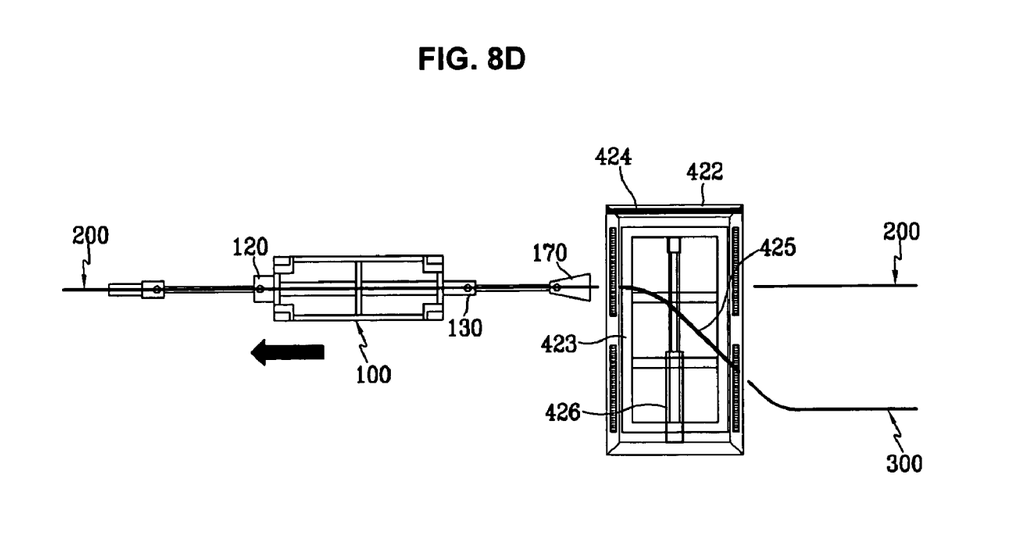

Accordingly, as shown in FIG. 8b, the driving part 120 of the carrier 100 moves into the guiding monorail 200 that is located to a front side with respect to the second removed portion 411 along the second track 424. Fourthly, as shown in FIG. 8c, when the driven part 130 of the carrier 100 comes into the second switch body 422 along the storing monorail 300, the driving part 120 of the carrier 100 is stopped. At the same time, the second slider 423 is moved toward a top direction of the FIG. by the second power source 426. Next, the guiding monorail 200 and the storing monorail 300 are connected to each other by a second track 425. Accordingly, as shown in FIG. 8d, the driven part 130 of the carrier 100 moves into the guiding monorail 200 along the second track 425.

As has been explained above, a carrier moving system for a painting process according to an embodiment of the present invention has the following advantages. A reception capacity of a CWB storage can be increased three times with comparison to the conventional carrier moving system. In addition, according to an embodiment of the present invention, the system can be operated for a predetermined time, although a body manufacturing process line is broken.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A carrier moving system for moving a plurality of multi-joint type carriers in a painting process through a loaded section where a carrier is loaded with a body-in-white and an unloaded section where a carrier is not loaded with a body-in-white, wherein each carrier of the plurality of multi-joint type carriers has a driving part and a driven part, the carrier moving system comprising:
   a guiding monorail disposed through both the loaded section and the unloaded section so as to guide each multi-joint type carrier through both sections;
   a storing monorail disposed in the unloaded section and arranged in parallel with the guiding monorail; and
   a switching unit for switching a position of the driven part of the multi-joint type carrier between the guiding monorail and the storing monorail;
   wherein the driving part directly contacts and moves along the guiding monorail;
   wherein the guiding monorail comprises:
      a first removed portion formed at a predetermined portion of the guiding monorail, the predetermined portion being opposite to an entrance of the storing monorail, and
      a second removed portion formed at a predetermined portion of the guiding monorail, the predetermined portion being opposite to an exit of the storing monorail;
   wherein the switching unit comprises:
      a first switch located to the first removed portion, and switching the driven part to the storing monorail when the carrier comes into the storing monorail; and
      a second switch located to the second removed portion, and switching the driven part to the guiding monorail when the carrier goes out of the storing monorail.

2. The carrier moving system of claim 1, wherein the first switch comprises:
   a first switch body located to the first removed portion of the guiding monorail;
   a first slider slidably disposed on the first switch body;
   a first track disposed on the first slider so as to interconnect the guiding monorails respectively located to a front side and a rear side with respect to the first removed portion when needed;
   a second track disposed on the first slider so as to interconnect the guiding monorail and the storing monorail; and
   a first power source disposed between the first switch body and the first slider, and moving the first slider when needed.

3. The carrier moving system of claim 1, wherein the second switch comprises:
- a second switch body located to the second removed portion of the guiding monorail;
- a second slider slidably disposed on the second switch body;
- a first track disposed on the second slider, and interconnecting the guiding monorails respectively located to a front side and a rear side with respect to the second removed portion;
- a second track disposed on the second slider, and interconnecting between the guiding monorail and the storing monorail when needed; and
- a second power source disposed between the second switch body and the second slider, and moving the second slider when needed.

4. The carrier moving system of claim 1, wherein the plurality of multi-joint type carriers comprise:
- a first multi-joint type carrier and a second multi-joint type carrier, wherein the first and second multi-joint type carriers comprise a gap maintaining unit such that a gap between the first and second multi-joint type carriers is fixedly maintained, while the first and second multi-joint type carriers exist in the storing monorail.

5. The carrier moving system of claim 4, wherein the gap maintaining unit comprises:
- a dog disposed on the driving part of the first multi-joint type carrier;
- a front bar with a predetermined length disposed on the driving part of the second multi-joint type carrier; and
- a sensor disposed on the front bar corresponding to the dog.

6. A carrier moving system, comprising:
- a guiding monorail substantially interconnecting a loaded section and an unloaded section, the guiding monorail guiding a multi-joint type carrier through both sections;
- a storing monorail disposed in the unloaded section and arranged substantially in parallel with the guiding monorail; and
- a switching unit for switching a position of a driven part of the multi-joint type carrier between the guiding monorail and the storing monorail;
- wherein a driving part of the carrier directly contacts and moves along the guiding monorail;
- wherein the guiding monorail comprises:
  - a first removed portion formed at a predetermined portion of the guiding monorail, the predetermined portion being opposite to an entrance of the storing monorail, and
  - a second removed portion formed at a predetermined portion of the guiding monorail, the predetermined portion being opposite to an exit of the storing monorail; and
- wherein the switching unit comprises:
  - a first switch located to the first removed portion, and switching the driven part to the storing monorail when the carrier comes into the storing monorail; and
  - a second switch located to the second removed portion, and switching the driven part to the guiding monorail when the carrier goes out of the storing monorail.

7. The carrier moving system of claim 6, wherein the first switch comprises:
- a first switch body located to the first removed portion of the guiding monorail;
- a first slider slidably disposed on the first switch body;
- a first track disposed on the first slider so as to interconnect the guiding monorails respectively located to a front side and a rear side with respect to the first removed portion when needed;
- a second track disposed on the first slider so as to interconnect the guiding monorail and the storing monorail; and
- a first power source disposed between the first switch body and the first slider, and moving the first slider when needed.

8. The carrier moving system of claim 6, wherein the second switch comprises:
- a second switch body located to the second removed portion of the guiding monorail;
- a second slider slidably disposed on the second switch body;
- a first track disposed on the second slider, and interconnecting the guiding monorails respectively located to a front side and a rear side with respect to the second removed portion;
- a second track disposed on the second slider, and interconnecting between the guiding monorail and the storing monorail when needed; and
- a second power source disposed between the second switch body and the second slider, and moving the second slider when needed.

9. The carrier moving system of claim 6, wherein the multi-joint type carrier comprises:
- a first multi-joint type carrier and a second multi-joint type carrier, wherein the first and second multi-joint type carriers comprise a gap maintaining unit such that a gap between the first and second multi-joint type carriers is fixedly maintained, while the first and second multi-joint type carriers exist in the storing monorail.

10. The carrier moving system of claim 9, wherein the gap maintaining unit comprises:
- a dog disposed on the driving part of the first multi-joint type carrier;
- a front bar with a predetermined length disposed on the driving part of the second multi-joint type carrier; and
- a sensor disposed on the front bar corresponding to the dog.

* * * * *